(12) United States Patent
Mueller et al.

(10) Patent No.: US 8,733,323 B2
(45) Date of Patent: May 27, 2014

(54) METHOD FOR ASCERTAINING AN ERROR IN A FUEL METERING UNIT OF AN INJECTION SYSTEM

(75) Inventors: Andreas Mueller, Lauffen A.N. (DE); Andreas Sommerer, Kernen (DE); Bernd Becker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1528 days.

(21) Appl. No.: 12/308,639

(22) PCT Filed: Jun. 18, 2007

(86) PCT No.: PCT/EP2007/056011
§ 371 (c)(1),
(2), (4) Date: Aug. 13, 2010

(87) PCT Pub. No.: WO2008/009527
PCT Pub. Date: Jan. 24, 2008

(65) Prior Publication Data
US 2010/0294247 A1    Nov. 25, 2010

(30) Foreign Application Priority Data

Jul. 18, 2006  (DE) .................. 10 2006 033 142
Nov. 17, 2006  (DE) .................. 10 2006 054 316

(51) Int. Cl.
*F02M 57/02*    (2006.01)

(52) U.S. Cl.
USPC ........... 123/446; 123/447; 123/495; 123/497; 123/480

(58) Field of Classification Search
USPC .................. 123/446, 447, 495, 497
See application file for complete search history.

(56) References Cited

U.S. PATENT DOCUMENTS

| 4,736,267 | A | 4/1988 | Karlmann et al. | |
| 6,384,512 | B1 | 5/2002 | Maeda | |
| 7,240,667 | B2* | 7/2007 | Dolker | 123/456 |
| 7,543,566 | B2* | 6/2009 | Holl et al. | 123/446 |
| 7,779,815 | B2* | 8/2010 | Ricco et al. | 123/446 |
| 8,005,603 | B2* | 8/2011 | Fisher et al. | 701/103 |
| 2006/0243244 | A1* | 11/2006 | Kasbauer et al. | 123/333 |
| 2009/0088950 | A1* | 4/2009 | Fisher et al. | 701/103 |
| 2009/0288638 | A1* | 11/2009 | Dintino et al. | 123/447 |

FOREIGN PATENT DOCUMENTS

| DE | 43 34 386 | 4/1994 |
| DE | 196 12 413 | 10/1997 |
| DE | 198 45 042 | 4/2000 |
| DE | 102 23 014 | 12/2003 |
| DE | 10 2004 005851 | 9/2005 |
| EP | 0 358 972 | 3/1990 |
| JP | 2002-324710 | 11/2002 |

* cited by examiner

*Primary Examiner* — Stephen K Cronin
*Assistant Examiner* — Joseph Dallo
(74) *Attorney, Agent, or Firm* — Kenyon & Kenyon LLP

(57) ABSTRACT

A method for ascertaining an error in a fuel metering unit of an injection system for an internal combustion engine, wherein the gradients of a first signal representing a physical variable and of a second signal representing a physical variable are determined, and at a predefined magnitude and/or direction of the two gradients an error is recognized.

10 Claims, 2 Drawing Sheets

METHOD FOR ASCERTAINING AN ERROR IN A FUEL METERING UNIT OF AN INJECTION SYSTEM

FIELD OF THE INVENTION

The present invention relates to a method for ascertaining an error in a fuel metering unit of an injection system for an internal combustion engine. The present invention furthermore relates to a device, in particular a control unit, for an internal combustion engine and a computer program for carrying out the method according to the present invention.

BACKGROUND INFORMATION

In today's common rail diesel injection systems, the fuel pressure for injection is electronically regulated. A fuel metering unit is used as an actuator in the low-pressure zone upstream from the high-pressure pump. German Patent No. DE 19612413, for example, describes a fuel metering unit of this type.

At this time, methods for diagnosing a defective circuit of the fuel metering unit are known. They are only able to recognize errors that are present for a longer time. Transient errors, for example, a brief intermittent contact, cannot be recognized.

SUMMARY OF THE INVENTION

An object of the present invention is therefore to provide a method which is able to detect an error in the circuit of the fuel metering unit.

This object is achieved by a method for ascertaining an error in a fuel metering unit of an injection system for an internal combustion engine in which the gradients of a first signal representing a physical variable and of a second signal representing a physical variable are determined, and at a predefined magnitude and/or direction of the two gradients an error is recognized. A predefined magnitude of the gradient is understood here as the steepness of the signal, i.e., the change in the signal within a (brief) time period. Direction of the gradient is understood here to be whether the signal changes toward larger or smaller values. These measures allow even transient errors such as a brief intermittent contact to be recognized. Time-consuming troubleshooting in the vehicle may thus be avoided.

It is preferably provided that the first signal presents a setpoint pumped quantity. The first signal may represent a trigger signal for the fuel metering unit. It is furthermore preferably provided that the trigger signal is a voltage applied to an actuator of the fuel metering unit. It is furthermore preferably provided that the trigger signal includes a duty factor of the voltage applied to the actuator of the fuel metering unit. Duty factor is understood here as the time ratio of high values to low values of a square-wave signal; i.e., this is a pulse-width-modulated signal.

It is preferably provided that the second signal represents a current flowing through the actuator of the fuel metering unit. It is furthermore preferably provided that an error is recognized when the gradients of the first signal and of the second signal are opposite to each other within a time window. The time window may be selected to be as small or as large as desired and may be set at any desired time. An error is preferably recognized when the gradient of the first signal within the time window is positive and the gradient of the second signal within the time window is negative. The error which is recognized using the method according to the present invention is preferably a circuit of the actuator that is interrupted at least from time to time, for example, due to a so-called intermittent contact, i.e., a contact point intermittently opened and closed due to vibrations.

The above-mentioned object is also achieved by a device, in particular a control unit for an internal combustion engine having means for ascertaining an error in a fuel metering unit of an injection system for an internal combustion engine in which the gradients of a first signal representing a physical variable and of a second signal representing a physical variable are determined, and at a predefined magnitude and/or direction of the two gradients an error is recognized.

The above-named object is also achieved by a computer program having program code for carrying out all steps of a method according to the present invention when the program is executed on a computer.

DETAILED DESCRIPTION

Figure 1:
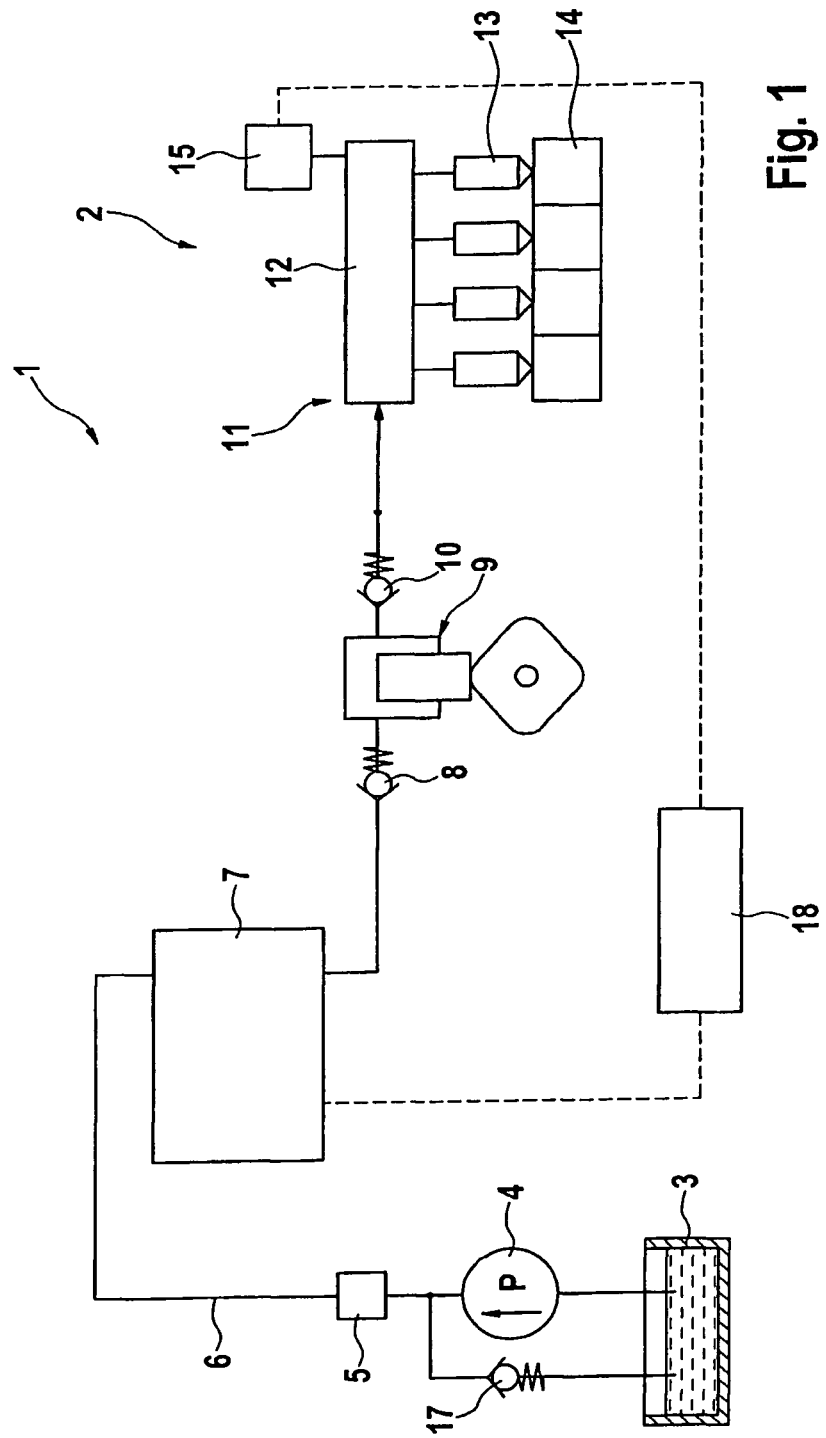
FIG. 1 shows a fuel system of an internal combustion engine.

A fuel system 1 according to FIG. 1 is part of an internal combustion engine 2, which may be installed in a motor vehicle (not depicted), for example. Fuel system 1 includes a fuel reservoir 3, from which an electrically driven pre-supply pump 4 pumps fuel to a low-pressure fuel line 6 via a filter 5. The low-pressure fuel line leads, via a metering unit 7, to an intake valve 8 of a high-pressure pump 9, which pumps, via a discharge valve 10, into a high-pressure zone 11 which includes a fuel rail 12 among other things, to which a plurality of injectors 13 is connected, each of which injects directly into the particular combustion chambers 14 associated with them. The pressure in high-pressure zone 11 is detected by a pressure sensor 15. Pressure limiting valve 17 is connected in parallel to pre-supply pump 4. Metering unit 7 includes a slide valve located in a housing, the slide valve being operated by an actuator controlled by a control and regulating unit 18 via an output stage (not depicted). The control and regulating unit receives signals from pressure sensor 15 among others.

Pressure sensor 15 delivers an electrical signal to control and regulating unit 18, indicated by a dashed line, which represents rail pressure $p_R$ in high-pressure zone 11. Control and regulating unit 18 delivers an electrical signal to metering unit 7, more precisely to the actuator (not depicted in detail) of metering unit 7, which opens and closes the slide valve. As the slide valve of metering unit 7 opens and closes, low-pressure fuel line 6 is connected to intake valve 8 of high-pressure pump 9 when the valve is open and is isolated from it when the valve is closed. The control voltage for the actuator of metering unit 7 is preferably a square-wave voltage. The square-wave voltage has a high voltage level and a low voltage level. The low voltage level is preferably 0 V. The slide valve of metering unit 7 is closed at the high voltage level and open at the low voltage level. Depending on the design of the slide valve and the actuator of metering unit 7, this may also be the reverse, i.e., that the metering unit opens at the high voltage level and closes at the low voltage level. The time ratio between the high voltage level and the low voltage level is known as the duty factor.

Figure 2:
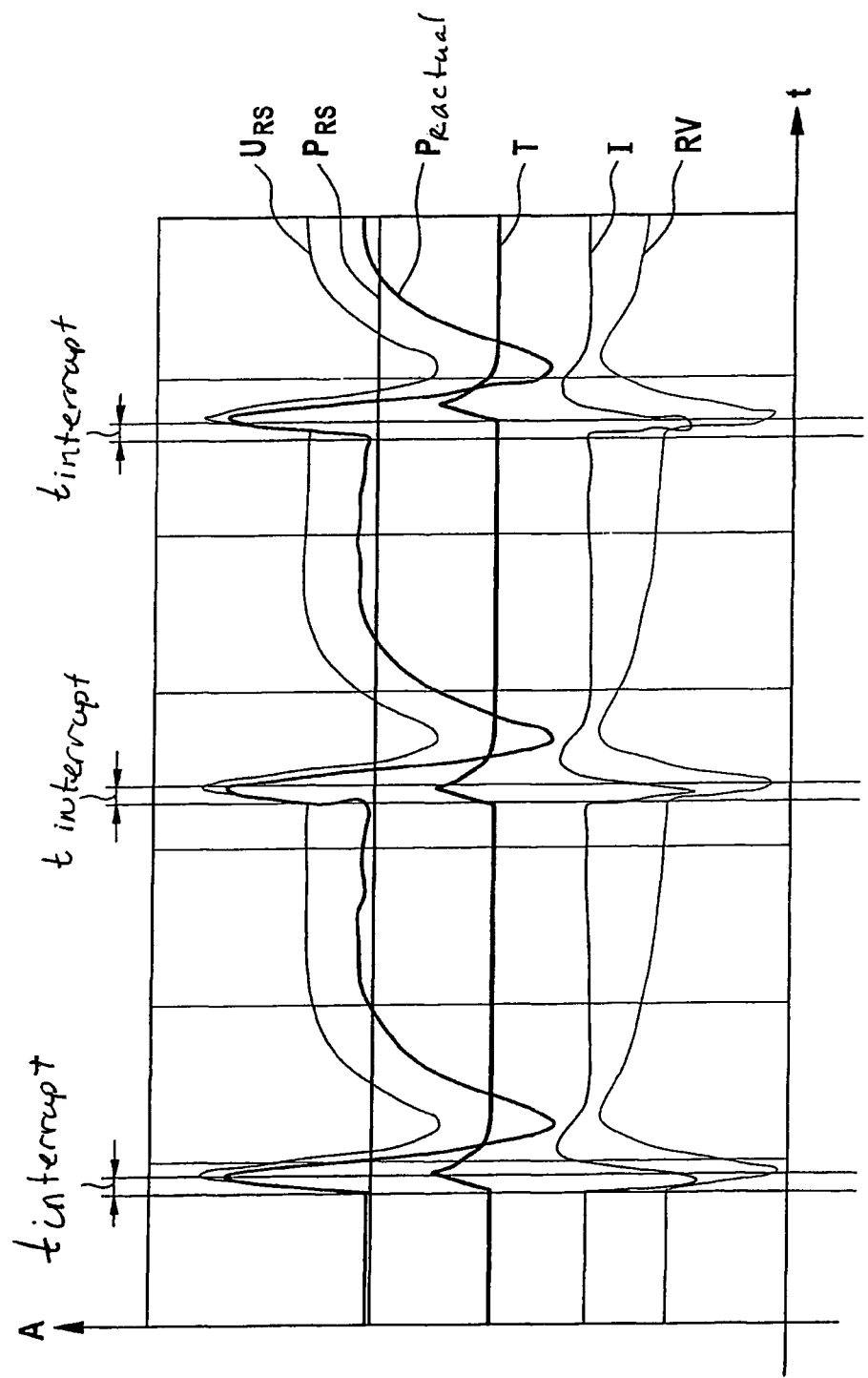
FIG. 2 shows a schematic view for examples of amplitudes of physical variables of an injection system.

FIG. 2 shows the amplitudes of signals representing different physical variables (measured variables) of the injection system. The (dimensionless) amplitudes of the signals representing the physical variables are shown; the amplitudes are labeled, in a generalized form, as A, plotted against time t. The setpoint value of rail pressure $p_{RS}$ is shown. Furthermore, the actual value of the rail pressure $p_{Ractual}$, the raw voltage value of the rail pressure $U_{RS}$, the duty factor for the energized state of metering unit 7 T, the variation of the current through metering unit 7 I, and controller-defined value RV are shown. The diagram further shows an interrupt time $t_{interrupt}$ in each case. During interrupt time $t_{interrupt}$, the circuit of the actuator of metering unit 7 is isolated, for example, due to an intermittent contact or the like within the circuit. By isolating the circuit, the gradient of duty cycle T increases, since the controller not shown in this exemplary embodiment attempts to regulate the actual value of the rail pressure, $p_{Ractual}$, back to the setpoint value of the rail pressure $p_{RS}$. The valve of metering unit 7 is open due to the open circuit, so that actual rail pressure $p_{Ractual}$ increases. A positive gradient of the duty factor means that the mean value of the square-wave voltage increases, i.e., the time periods during which the signal is "high" become longer and the time periods during which the signal is "low" become shorter. The current flow is reduced simultaneously due to the interruption of the circuit for time $t_{interrupt}$; this is manifested in a negative gradient of current I. As is apparent from FIG. 2, the opening of the actuator circuit of metering unit 7 also results in duty factor T from controller-defined value RV having a positive gradient, while the current has a negative gradient at the same time.

In the case of an intermittent contact, metering unit 7 is not energized during the contact interrupt. As a result, the rail pressure has an increasing gradient due to metering unit 7 which is opening. The controller-defined value of the duty factor increases by the rail pressure to the setpoint specification, but has no effect on the rail pressure until the contact is closed again. The different signs of the gradient of the actual current and of the duty factor of the controller-defined value are used to unambiguously detect an intermittent contact. The above-described recognition of an intermittent contact of the fuel metering unit is usable in the common rail injection system in which the fuel pressure is regulated by a metering unit and the control unit has the resources to evaluate the gradient of the duty factor of the controller-defined value and of the actual current variation of the metering unit.

What is claimed is:

1. A method for ascertaining an error in a fuel metering unit of an injection system for an internal combustion engine, comprising:

determining a first gradient of a first signal representing a physical variable and a second gradient of a second signal representing a physical variable; and recognizing an error at at least one of a predefined magnitude and a predefined direction of the first and second gradients.

2. The method according to claim 1, wherein the first signal represents a setpoint pumped quantity.

3. The method according to claim 1, wherein the first signal represents a trigger signal for the fuel metering unit, the trigger signal being a voltage applied to an actuator of the fuel metering unit.

4. The method according to claim 3, wherein the trigger signal includes a duty factor of the voltage applied to the actuator of the fuel metering unit.

5. The method according to claim 1, wherein the second signal represents a current flowing through an actuator of the fuel metering unit.

6. The method according to claim 1, wherein an error is recognized when the first and second gradients are opposite to each other within a time window.

7. The method according to claim 6, wherein an error is recognized when the first gradient within the time window is positive and the second gradient within the time window is negative.

8. The method according to claim 1, wherein the error is a circuit of an actuator of the fuel metering unit interrupted at least from time to time.

9. A device for ascertaining an error in a fuel metering unit of an injection system for an internal combustion engine, comprising:

a control unit for determining a first gradient of a first signal representing a physical variable and a second gradient of a second signal representing a physical variable, and for recognizing an error at at least one of a predefined magnitude and a predefined direction of the first and second gradients.

10. A computer-readable medium containing a computer program which, when executed by a processor, performs the following method for ascertaining an error in a fuel metering unit of an injection system for an internal combustion engine:

determining a first gradient of a first signal representing a physical variable and a second gradient of a second signal representing a physical variable; and recognizing an error at at least one of a predefined magnitude and a predefined direction of the first and second gradients.

* * * * *